US 6,603,648 B1

(12) United States Patent
Ette et al.

(10) Patent No.: US 6,603,648 B1
(45) Date of Patent: Aug. 5, 2003

(54) CIRCUIT BREAKER HAVING AN ELECTRONIC TRIPPING UNIT AND PARAMETERIZATION LOCKING

(75) Inventors: Bernd Ette, Moenchwinkel (DE); Hans Rehaag, Zepernick (DE); Andreas Pancke, Berlin (DE); Peter Schust, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/674,188
(22) PCT Filed: Apr. 16, 1999
(86) PCT No.: PCT/DE99/01207
§ 371 (c)(1), (2), (4) Date: Jan. 29, 2001
(87) PCT Pub. No.: WO99/56371
PCT Pub. Date: Nov. 4, 1999

(30) Foreign Application Priority Data

Apr. 29, 1998 (DE) .......................... 198 20 173

(51) Int. Cl.$^7$ ................................. H02H 3/08
(52) U.S. Cl. ............... 361/93.3; 361/93.1; 340/540; 340/542; 340/568.1
(58) Field of Search ............... 361/93.3, 93.1; 340/540, 542, 568.1

(56) References Cited

U.S. PATENT DOCUMENTS 4,181,906 A    1/1980   Matsko et al.
4,210,887 A    7/1980   Matsko et al.
4,870,531 A    9/1989   Danek
4,945,443 A    7/1990   DeBiasi et al.

FOREIGN PATENT DOCUMENTS

DE    39 26 414      2/1990
DE    691 17 712     10/1996
EP    0 391 143      10/1990
WO    WO 97/08725    3/1997

Primary Examiner—Brian Sircus
Assistant Examiner—Isabel Rodriguez
(74) Attorney, Agent, or Firm—Kenyon & Kenyon

(57) ABSTRACT

A circuit breaker having a switch rated current setting on an electronic tripping unit is described. This is suitable for all circuit breakers having an electronic tripping unit that can be removed from the circuit breaker housing after removing a seal and can be lockably parameterized at the rated current of the circuit breaker.

In parameterization of electronic tripping units of circuit breakers, the possibility of unauthorized parties tampering with the tripping unit must be prevented.

Therefore, the tripping unit is equipped with a monitoring circuit which prevents the possibility of parameterization of the tripping unit when there is a galvanic connection between the trip magnet and the tripping unit. This permits parameterization only when the tripping unit has been removed, i.e., only by authorized personnel.

2 Claims, 1 Drawing Sheet

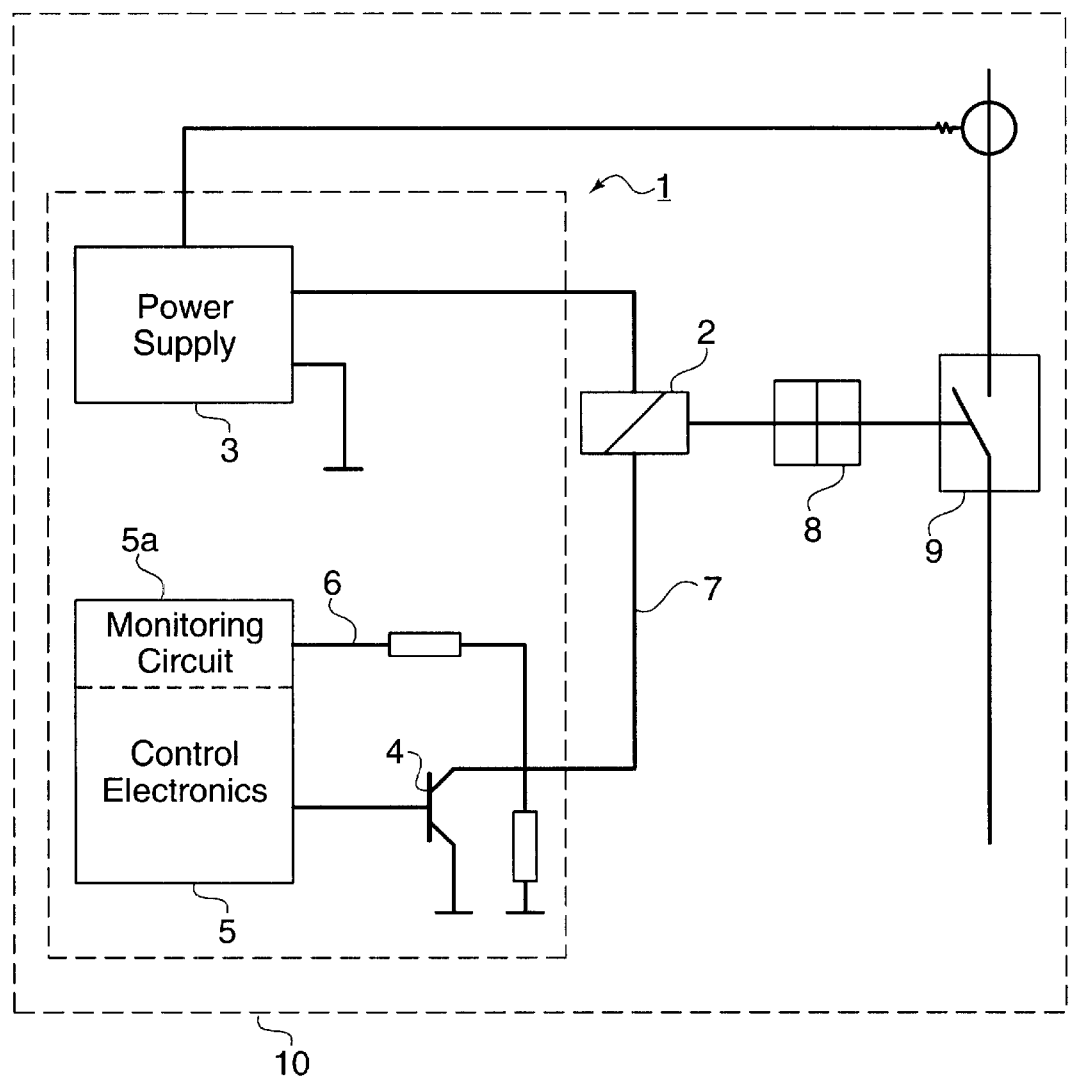

CIRCUIT BREAKER HAVING AN ELECTRONIC TRIPPING UNIT AND PARAMETERIZATION LOCKING

FIELD OF THE INVENTION

The present invention relates to a circuit breaker having an electronic tripping unit accommodated in the circuit breaker housing for a trip magnet operating the switch contacts of the circuit breaker over a breaker mechanism.

BACKGROUND INFORMATION

Circuit breakers having an electronic trip such as those described in U.S. Pat. No. 4,210,887 or in U.S. Pat. No. 4,181,906, for example, have a housing with a compartment into which the tripping unit can be inserted interchangeably. Electronic tripping units may have the same design for a plurality of types of circuit breakers because the electronic circuit can easily be adapted to the rated current, the breaking capacity class and other characteristics of the switch. The parameters of the tripping unit are defined only for the current values valid for the respective circuit breaker through the rated current plug which can be plugged into the electronic circuit. The interchangeability of the tripping unit also has the advantage that it can be removed in the event of a disturbance and tested in a testing device and optionally replaced by a new unit without having to dismantle the circuit breaker. If the tripping unit is not the cause of the disturbance, this provides information at the same time that only the switch part can be responsible for the disturbance, so then the switch part is to be replaced.

U.S. Pat. No. 4,181,906 and U.S. Pat. No. 4,210,887 describe a safety device which prevents the insertion of a tripping unit which is unsuitable for a given circuit breaker into the above-mentioned compartment of the switch housing. This is accomplished through a system of coding pins on the switch side that work together with receptacle openings in the housing of the electronic tripping unit. For example, this makes it possible to prevent the use of a tripping unit without ground fault protection or a tripping unit that is not designed for the tripping characteristic of a switch of a certain breaking capacity class. This also ensures that the circuit breaker cannot be switched on if the tripping unit cannot be inserted completely into the receptacle compartment of the switch housing because of the arrangement of coding pins and the respective receptacle openings.

However, a correct and fitting match of tripping unit and circuit breaker is often not sufficient for the required protection of equipment and systems. Instead, an adapted activation and adjustment of the possible trip parameters is important for safe operation. However, this cannot be achieved through coding, because it often occurs that the settings of the tripping unit must be changed when the operating mode of a consumer changes, for example. Changes can be made in the settings of the tripping unit even if a seal is provided for the access to the adjustment components of the tripping unit as described in German Patent No. 39 26 414. In that case, the user can only see that there has been unauthorized access.

SUMMARY

An object of the present invention is to provide a circuit breaker having an electronic tripping unit and lockable parameter assignment such that the tripping unit has a simple design and yet allows parameter assignment only by authorized personnel.

According to the present invention, this object is achieved by providing a circuit breaker having an electronic tripping unit that can be lockably parameterized to the rated current of the circuit breaker and can be removed from the circuit breaker housing after removing a seal, for a trip magnet which operates the switch contacts of the circuit breaker over a breaker mechanism and having a monitoring circuit which belongs to the tripping unit and prevents the tripping unit from being parameterized when there is an electrical connection between the trip magnet and the tripping unit.

The monitoring circuit may be designed so that its input receives a voltage which is applied to an electronic switch of the tripping unit, and the electronic switch trips the trip magnet.

When the tripping unit is removed from the housing of the circuit breaker, the electrical connection between the tripping unit and the magnet coil is interrupted so that no voltage can be measured across the electronic switch provided with the tripping unit. The monitoring circuit then allows parameterization.

This measure does not prevent the tripping unit from then being set at the wrong parameters, but it does allow parameterization only by authorized personnel, because at least one seal must be broken to remove the tripping unit.

BRIEF DESCRIPTION OF THE DRAWING

The FIGURE shows a schematic drawing of an example embodiment of the present invention.

DETAILED DESCRIPTION

The main components of the electric part of a circuit breaker are tripping unit 1 and trip magnet 2. Both components are accommodated together with breaker mechanism 8 and switch contacts 9 in a common housing 10, and tripping unit 1 can be removed from housing 10, as indicated by the border.

Power supply 3 for tripping unit 1 itself and for trip magnet 2 of the circuit breaker is also accommodated in tripping unit 1. Trip magnet 2 is controlled by electronic switch 4 in tripping unit 1. Control electronics 5 are indicated here with monitoring circuit 5a of tripping unit 1 whose input 6 receives a potential, which is applied to electronic switch 4 and to trip magnet 2.

If tripping unit 1 is removed from the circuit breaker housing, electrical connection 7 which would otherwise exist between trip magnet 2 and tripping unit 1 is interrupted. Control electronics 5 detect that no voltage is applied to input 6. Control electronics 5 then release a lock for parameterization of tripping unit 1. Parameterization can thus be performed only when tripping unit 1 is removed.

What is claimed is:

1. A circuit breaker, comprising:
   a circuit breaker housing;
   switch contacts arranged in the circuit breaker housing;
   a breaker mechanism arranged in the circuit breaker housing;
   a trip magnet arranged in the circuit breaker housing that operates the switch contacts via the breaker mechanism; and
   an electronic tripping unit removable from the circuit breaker housing after removing a seal, the electronic tripping unit being lockably parameterizable at a rated current of the circuit breaker for the trip magnet, the tripping unit including a monitoring circuit that always prevents parameterization of the tripping unit when there is an electrical connection between the trip-magnet and the tripping unit.

2. The circuit breaker according to claim 1, wherein an input of the monitoring circuit receives a voltage which is applied to an electronic switch of the tripping unit which trips the trip magnet.

\* \* \* \* \*